R. V. AND C. F. BLOOMHUFF.
FLAME PROJECTOR SPARK PLUG.
APPLICATION FILED DEC. 22, 1916.
1,320,115. Patented Oct. 28, 1919.
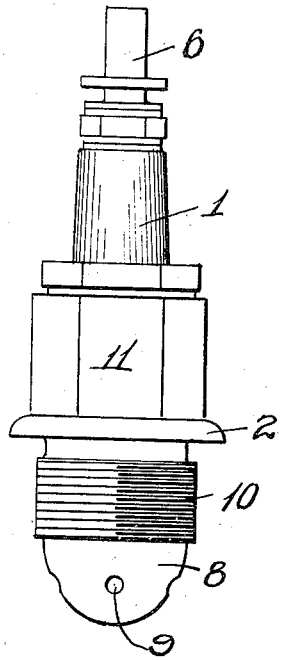
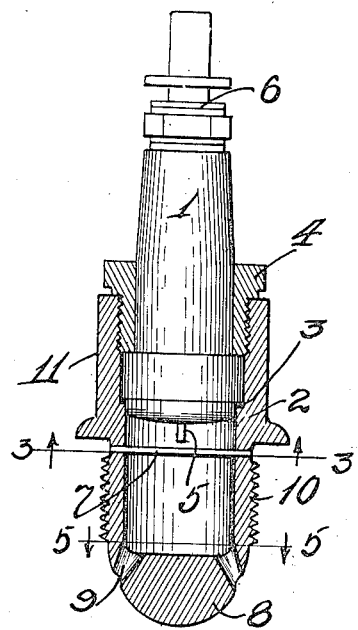
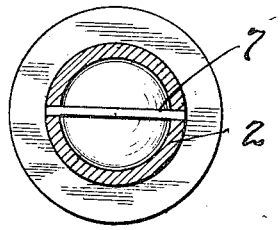
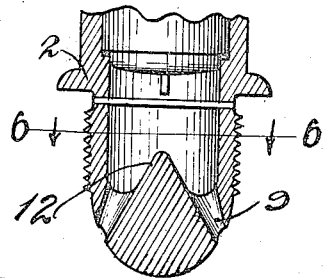
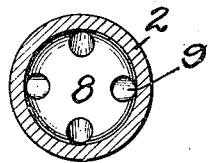
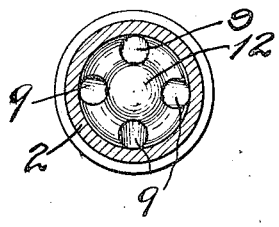

UNITED STATES PATENT OFFICE.

RALPH V. BLOOMHUFF AND CHARLES F. BLOOMHUFF, OF CHICAGO, ILLINOIS, ASSIGNORS OF ONE-THIRD TO HENRY E. PIERPONT, OF CHICAGO, ILLINOIS.

FLAME-PROJECTOR SPARK-PLUG.

1,320,115.      Specification of Letters Patent.      Patented Oct. 28, 1919.

Application filed December 22, 1916. Serial No. 138,315.

*To all whom it may concern:*

Be it known that we, RALPH V. BLOOMHUFF and CHARLES F. BLOOMHUFF, citizens of the United States, and residents of the city of Chicago, in the county of Cook and State of Illinois, have invented certain new and useful Improvements in a Flame-Projector Spark-Plug; and we do hereby declare that the following is a full, clear, and exact description of the same, reference being had to the accompanying drawings, and to the numerals of reference marked thereon, which form a part of this specification.

This invention relates to an improved construction of a spark plug adapted to be mounted in the cylinder of an internal combustion engine whereby ignition of the combustible mixture in the cylinder is caused to take place first by the primary ignition of a small volume of the mixture in a small chamber formed in the plug itself. The explosive force of combustion then causes a rapid flame propagation from the small space through a number of ports through which the tongues of flame are projected to cause a uniform ignition of the main charge of fuel throughout the engine cylinder.

It is an object therefore of this invention to construct a spark plug adapted to be threaded into the cylinder of an engine permitting ignition of a primary fuel charge first within the plug itself and then, due to the explosive force and rapidity of flame propagation thus induced, causing a secondary uniform ignition of the main charge of the fuel in the cylinder of the engine.

It is also an object of this invention to construct a spark plug with the spark terminals housed within a small chamber to shield the terminals or sparking points from oil spray which in some instances may be present in the cylinder, said chamber operating to heat a primary charge of the fuel therein preliminary to ignition thereof from the spark terminals to cause a uniform ignition of the main or secondary charge of fuel in the cylinder by projection of the flame through ports in said chamber resulting from the ignition of the primary charge of fuel.

It is finally an object of this invention to construct a spark plug to ignite the main charge of fuel in the cylinders of the engine by a series of flame jets from preignition of a charge of fuel within a supplementary chamber formed within the plug, thus affording a uniform ignition and complete combustion of the main fuel charge.

The invention (in a preferred form) is illustrated in the drawings and hereinafter described.

In the drawings:

Figure 1 is a side elevation of a spark plug embodying the principles of our invention.

Fig. 2 is a central vertical section therethrough with parts in elevation.

Fig. 3 is a section on line 3—3 of Fig. 2.

Fig. 4 is a fragmentary view similar to Fig. 2, showing a modified form of construction.

Fig. 5 is a detail section on line 5—5 of Fig. 2.

Fig. 6 is a detail section on line 6—6 of Fig. 4.

As shown in the drawings:

The reference numeral 1, indicates the usual insulating porcelain or other material forming the insulation member of a spark plug which is mounted in a cylindrical sleeve or chamber element 2, and held compressed therein in sealing relation through a suitable gasket 3, by a threaded gland 4. A sparking terminal 5, projects through the lower end of the insulation member 1, and an electrical conductor therefor extends upwardly centrally through the insulation member in a usual manner, and at the upper end is electrically connected to a binding or terminal post 6, to which a wire may be connected. Extending transversely within the sleeve element 2, beneath the spark terminal 5, is a bar 7, which affords the other terminal for the spark, the terminal 5 and bar 7, being spaced sufficiently apart to afford the usual spark gap used in spark plug structures.

As clearly shown, the lower end of the sleeve element 2, is rounded, as denoted by the reference numeral 8, and formed therethrough are a number of conical radially directed apertures or ports 9. The lower end 10, of the sleeve element 2, is threaded on its exterior to permit attachment thereof into the cylinder of the engine, and the upper end 11, thereof is hexagonal as clearly shown in Fig. 1, affording a nut to which a wrench may be attached for convenient connection of the device into the cylinder of an engine.

In the modified form of device illustrated in Figs. 4 and 6, instead of the interior of the sleeve element 2, at its lower end being substantially flat, as shown in the form of device illustrated in Fig. 2, the interior lower end is conical as denoted by the reference numeral 12, in line with the direction of inclination of the side walls of the ports 9. This peculiar interior shape of the chamber element permits a nozzle effect to take place at the time of firing the chamber charge so that the jets of flame are actually projected under the force of the primary explosion into the main charge for complete ignition thereof and without any back pressure effects tending to smother the flame jets.

The operation is as follows:

When the device is in use in the cylinders of an engine, the inclosure for the sparking terminals serves as protective means to prevent oil spray or oil being thrown up by the piston upon the sparking points or around the insulation member of the spark plug to cause short circuiting of the plug or the formation of carbon which would cause fracture of the insulation member. A further and important advantage, however, is the fact that when the fuel charge is compressed for ignition in the cylinder of the engine, a certain portion of the charge, of course, is forced into the preheating chamber of the sleeve element 2, and when the spark takes place at the spark terminals, this small charge is first ignited. A number of flame jets, due to the explosive effect of combustion, are thus projected outwardly through the respective ports 9, in all directions within the cylinder of the engine. As a consequence a uniform ignition of the main fuel charge is assured as well as complete and perfect combustion of the fuel mixture. Although this operation has been described as taking place in a series of successive steps, the actual time for the entire operation to proceed is practically instantaneous and almost negligible. However, if the time of flame propagation is to be considered, inasmuch as this characteristic will vary for different engines, due to differences in compression pressures and other factors, it is a simple matter, of course, to advance the spark timing of the engine to compensate for the retardation effect of the flame jet ignition of the main charge, or to retard the spark if the opposite condition should obtain.

The different shapes of the lower end of the auxiliary combustion chamber formed within the sleeve 2, as shown comparatively in Figs. 2 and 4, is illustrative of the different possibilities of development and range of modifications of which the device is susceptible. The shape of the interior of the supplementary combustion chamber affects the operation of the device, and this is a feature for consideration in installations upon different types of engines. The cone point 12, acts as a preheating means upon the fuel charge that is compressed into the spark plug chamber through the ports 9, and in any event the primary charge in said chamber is preheated, due to the heat of the surrounding walls of the chamber, which are necessarily at a higher temperature than the water or air cooled walls of the cylinder itself. Thus the tiny spark serves effectually to ignite the preheated charge within the chamber. The interior and exterior of the spark plug chamber element is entirely free from rough surfaces and sharp edges which might under some conditions of operation become heated to incandescence thus causing a preignition of the fuel mixture before occurrence of the spark. Furthermore the edge effect is not present to retard that portion of flame propagation due to actual flow of the exploded primary charge. It has been found that engines in which this type of plug are used produce more power and are more free from carbon than where an ordinary spark plug is used. This illustrates that the combustion of the mixture is improved so that a higher efficiency of operation is obtained from a consequent and obvious reduction of carbon deposits, which unquestionably is largely due to complete combustion of a fuel mixture.

We are aware that the details of construction may be varied through a wide range without departing from the principles of our invention, and we therefore do not purpose limiting the patent granted otherwise than necessitated by the prior art.

We claim as our invention:

A spark plug comprising a cylindrical internally and externally threaded member, a gland threaded into the upper end of said member, an insulating element held secured in said member thereby, a spark terminal extending through said insulating element, another spark terminal secured adjacent thereto in said first-mentioned member, said first-mentioned member having a plurality of downwardly outwardly directed conical apertures radially disposed with reference to the spark gap between said terminals, and the lower end of said first-mentioned member formed conical, affording an inwardly directed point of metal within said member extending toward said spark gap affording a preheating means for gases within said member preliminary to ignition thereof.

In testimony whereof we have hereunto subscribed our names in the presence of two subscribing witnesses.

RALPH V. BLOOMHUFF.
CHARLES F. BLOOMHUFF.

Witnesses:
CHARLES W. HILLS, Jr.,
EARL M. HARDINE.